US006304333B1

(12) United States Patent
Shaked et al.

(10) Patent No.: US 6,304,333 B1
(45) Date of Patent: Oct. 16, 2001

(54) APPARATUS AND METHOD OF PERFORMING DITHERING IN A SIMPLEX IN COLOR SPACE

(75) Inventors: Doron Shaked, Haifa; Nur Arad, Tel-Aviv; Izhak Baharav, Girat-Ela, all of (IL); Qian Lin, Santa Clara, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/136,558

(22) Filed: Aug. 19, 1998

(51) Int. Cl.[7] ....................................... B41B 13/08
(52) U.S. Cl. .................... 358/1.1; 358/1.9; 358/1.62; 358/1.67
(58) Field of Search .................... 382/162, 167; 358/1.1, 1.6, 1.7, 1.8, 1.9

(56) References Cited

U.S. PATENT DOCUMENTS

| | | | |
|---|---|---|---|
| 5,485,558 | * | 1/1996 | Weise et al. ............ 395/131 |
| 5,933,150 | * | 8/1999 | Ngo et al. ............... 345/473 |
| 5,936,628 | * | 8/1999 | Kitamura et al. ........ 345/420 |
| 5,974,521 | * | 10/1999 | Akerib ..................... 712/11 |
| 5,977,977 | * | 11/1999 | Kajiya et al. ............ 345/418 |
| 5,991,438 | * | 11/1999 | Shaked et al. ........... 382/162 |
| 6,072,496 | * | 6/2000 | Guenther et al. ........ 345/419 |
| 6,215,561 | * | 4/2001 | Kakutani ................. 358/1.9 |

* cited by examiner

*Primary Examiner*—David Moore

(57) ABSTRACT

A pixel color in an image can be represented by a dot color in a dot pattern as follows. A subset of a limited set of display colors is selected. The subset has N display colors that can render a solid color patch of the pixel color. The colors of the subset correspond to vertices of a simplex in the color space. The simplex has (N−1) dimensions. A point operation is then performed to select one of the vertices of the simplex and thereby select the dot color of the subset color corresponding to the selected vertex. Consequently, a solid patch of the pixel color can be rendered by a dot pattern having no more than N different colors. The dot pattern can be displayed by an imaging device such as an inkjet printer, which has a limited set of display colors.

30 Claims, 6 Drawing Sheets

APPARATUS AND METHOD OF PERFORMING DITHERING IN A SIMPLEX IN COLOR SPACE

BACKGROUND OF THE INVENTION

The invention relates generally to the display of digital images. More specifically, the invention relates to an apparatus and method of performing dithering to enhance the quality of displayed images.

A computer monitor having 24-bit color capability can display photo-realistic images. Such high quality can be achieved in part because the 24-bit color capability provides a choice of 16.7 million discrete colors for each individual pixel of the image being displayed.

A conventional inkjet printer, on the other hand, does not have a choice of 16.7 million colors for printing an image. The conventional inkjet printer deposits dots of colored ink on a sheet of paper. Within the space of each dot, the conventional inkjet printer might deposit one of eight solid colors: cyan, yellow, magenta, black, white, red, green and blue. Thus, the conventional inkjet printer has a choice of eight printable colors.

The inkjet printer might use a digital halftoning method to create a perception that it is printing with a wider range of colors than it actually is. When printing a solid color patch, the inkjet printer can place dots of different colors in a high frequency pattern. When viewing the high frequency pattern, the human visual system "applies" a low-pass filter and perceives only the average color of the dots in the pattern. Thus, a dot pattern including black and white dots appears as a shade of gray. The shade of gray depends upon the relative quantities of black and white dots in the pattern.

Monochrome dithering is a halftoning method in which the gray values of a monochrome image are compared against an array of thresholds. Ink dots are deposited in those locations where the pixel values are less than or equal to the threshold values. Standard (Cartesian) dithering is an overlay of three monochrome dithering processes, each of which is applied separately to a single color plane. Thus, a halftone color is a Cartesian product of three halftoned monochrome planes corresponding to color components. When printing a halftone color, potentially all eight colors are used in a solid color patch.

To produce a good halftone color, the color dots are placed such that their placement pattern is visually unnoticeable. Additionally, the dot colors are selected such that the local average color of the dots is the desired color of the color patch.

However, there are problems associated with halftoning methods, especially at printing resolutions of up to 600 dots per inch ("dpi"). Because inkjet dot patterns at 600 dpi can be resolved by the human eye, the dots might be perceived as artifacts and other types of noise. The noise might degrade the quality of the printed image and result in a grainy image.

Efforts have been made to improve print quality by increasing the color choices at each dot. This has been achieved by controlling the amount of ink deposited at each dot. Varying the amount of ink can control the intensity at each dot. The HP DeskJet 850C inkjet printer, available from the Hewlett-Packard Company, can vary the amount of ink deposited at each dot to print up to 64 different color and grayscale choices at each dot. Smoother dither patterns and halftones result in a less grainy image.

Other efforts have been made to minimize the noise in the image in order to produce a smoother dither patterns and halftones. For example, efforts have been directed towards determining optimal patterns for placing the dots. Efforts have also been directed towards determining an optimal number of dots that should be used for each color.

SUMMARY OF THE INVENTION

A different approach towards minimizing noise is to reduce the variation in brightness of the dots in the patterns. A pixel color of an image can be represented by a representative color in a color pattern as follows. A subset of a limited set of display colors is selected. The subset has N display colors that can render a solid color patch of the pixel color. The number N is an integer greater than two and less than the number of display colors in the limited set. The colors of the subset correspond to vertices of a simplex in the color pace. The simplex has (N–1) dimensions.

A point operation is then performed to select one of the vertices of the simplex and thereby select the representative color as the subset color corresponding to the selected vertex. Consequently, a solid patch of the pixel color can be rendered by a dot pattern having no more than N different colors. The color pattern can be displayed by an imaging device that can display the limited set of display colors.

Other aspects and advantages of the present invention will become apparent from the following detailed description, taken in conjunction with the accompanying drawings, illustrating by way of example the principles of the present invention.

DETAILED DESCRIPTION OF THE INVENTION

Figure 1:
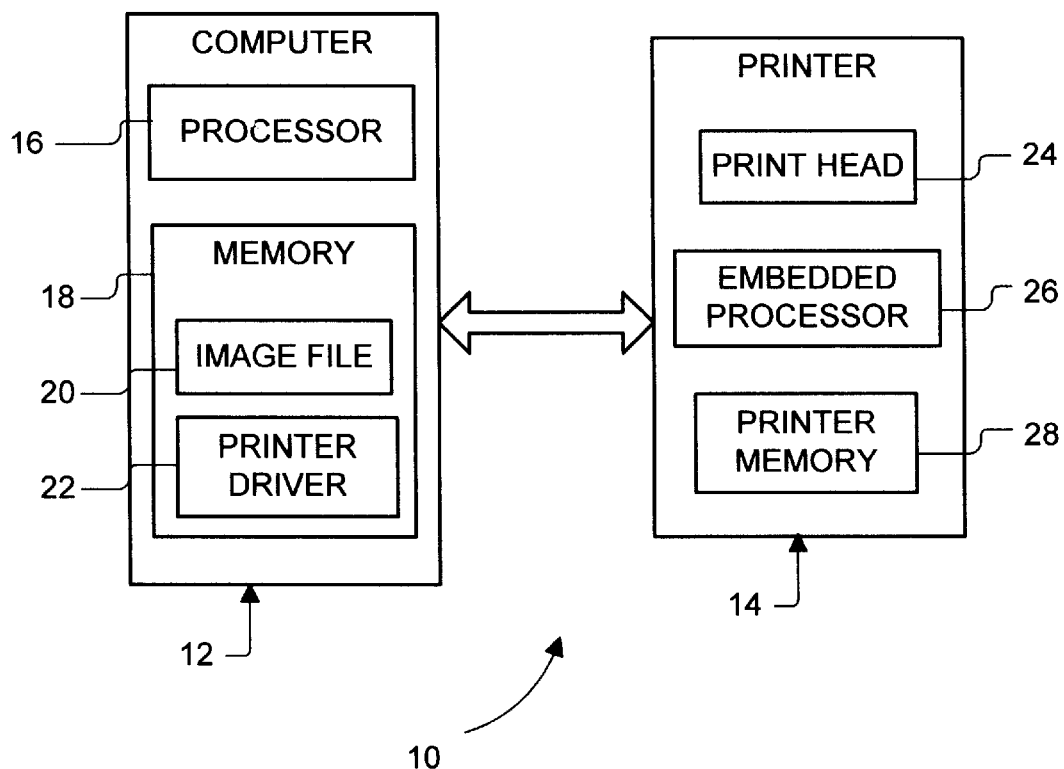
FIG. 1 is a block diagram of a computer system including a computer and a printer.

As shown in the drawings for purposes of illustration, the present invention is initially described in connection with a computer system including a computer and a printer. The printer can print only a limited set of display colors. However, the printer may use a dithering method to create a perception that a wider range of display colors is being printed. The dithering method is performed in accordance with the present invention to reduce brightness variations in dot patterns representing an image.

FIG. 1 shows a computer system 10 including a computer 12 and a printer 14. The printer 14 can be an inkjet printer. For exemplary purposes only, the printer 14 will be described in connection with an eight-color inkjet printer. The colors that can be printed by the printer 14 include black ("K"), blue ("B"), red ("R"), green ("G"), magenta ("M"), cyan ("C"), yellow ("Y") and white ("W"). The printer 14 prints patterns of colored dots on a medium such as a sheet of white paper. Each dot is one of the eight colors.

The computer 12 includes a processor 16 and computer memory 18. An image file 20 may be stored in the computer memory 18 or read from an input and processed on the fly. For exemplary purposes only, the image file 20 represents a single image. The image is represented in the RGB domain by 24-bit words. Each 24-bit word corresponds to a pixel of the image. For each 24-bit word, a first group of eight bits represents intensity of a red component of the corresponding pixel, a second group of eight bits represents intensity of a green component, and a third group of eight bits represents intensity of a blue component. Each 24-bit word allows a range of $2^{24}$ (approximately 16.7 million) colors to be represented by each pixel.

To print the image, the computer 12 accesses the image file 20 and a printer driver 22 stored in computer memory 18. The printer driver 22 includes a plurality of executable instructions that, when executed, instruct the processor 16 to interpolate the image, if necessary, to match the printer resolution (e.g., 600 dots per inch), create a map of dot patterns representing the interpolated image, and send the dot map to the printer 14 for printing.

Since the printer 14 can only display a range of eight colors, the printer driver 22 uses a dithering method to determine the dot colors in the dot patterns. For each dot pattern that represents a solid patch of color, the local average of the dot colors in the dot pattern is equal to the desired color of the color patch. The dots are placed in a pattern that reduces perceptibility.

The dot colors are also selected to reduce brightness variations in patches of solid color. The human visual system is more perceptible to changes in brightness than to changes in chrominance, which average out at much lower frequencies. Reducing the brightness variations in the solid color patches reduces perceptible noise in the image.

To perform the dithering method, the printer driver 22 instructs the processor 16 to select a color quadruple (that is, a set of four printable colors) for each pixel to be printed. There is a limited set of selectable color quadruples within the limited set of printable colors. The printer driver 22 also instructs the processor 16 to select one of the colors in the color quadruple. Thus, the pixel color is represented by a displayable dot of the selected color. Consequently, no more than four colors will be used to render a solid color patch.

The printer 14 receives the dot patterns and prints out the image on a sheet of paper. The printer 14 includes a print head 24 movable along a rail, a servo for controlling the position of the print head 24 along the rail as well as the firing of the print head 24. The print head servo includes an embedded processor 26 and memory 28. The printer memory 28 could include a plurality of executable instructions for instructing the embedded processor 26 to select the dot colors using the dithering method according to the present invention.

Figure 2:
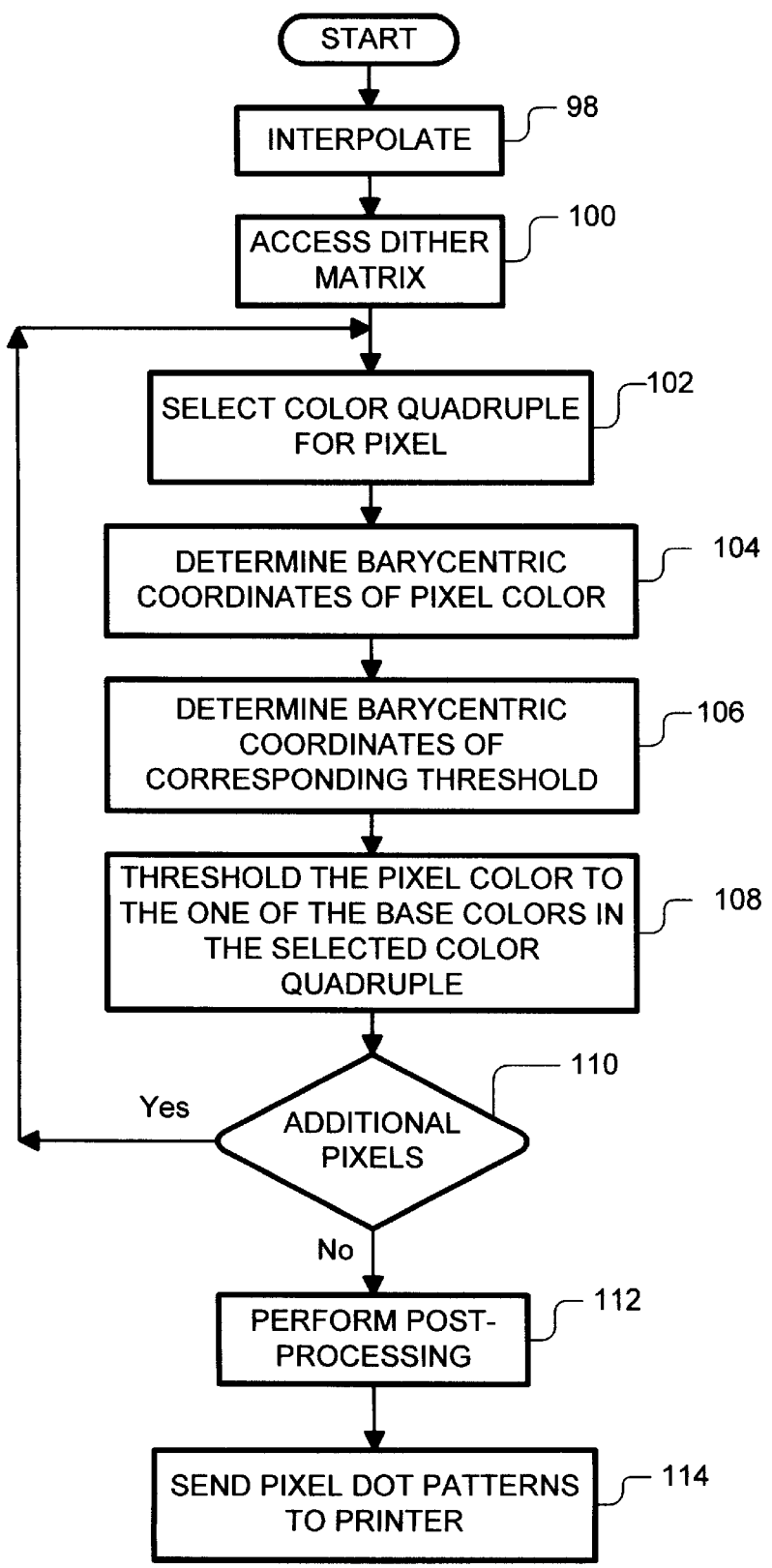
FIG. 2 is a flowchart of a method of performing dithering according to the present invention.

FIG. 2 describes the dithering method in greater detail. The processor 16 interpolates the image, if necessary, so that each pixel in the image corresponds to a dot in the printed image (step 98). Then the processor 16 accesses a dither-matrix from memory 18 (step 100). The dither matrix, which includes an array of threshold values, also forms a part of the printer driver 22. If the dither matrix does not cover the entire image, it is tiled across the image until the entire image is covered. Construction of the dither matrix will be described below in connection with FIG. 7.

Each pixel of the image is processed one at a time. Each pixel has a desired color. The following four steps 102 to 108 are performed for each pixel. The steps 102 to 108 could be performed sequentially or in parallel.

In the first of the four steps (step 102), the processor 16 selects a color quadruple from the limited set of color quadruples. For example, a color cube defined by the eight printable colors could be partitioned into the following limited set of the six color quadruples shown in FIG. 4: CMYW, MYGC, RGMY, KRGB, RGBM, and CMGB.

Figure 3:
FIG. 3 is a brightness scale of the printer's displayable colors.

These six color quadruples are chosen to minimize the contrast in brightness. Shown in FIG. 3 is a brightness scale of the eight displayable colors that can be printed by the printer 14. When creating a patch of solid color, it would be most desirable to use adjacent colors on the scale. It would be less desirable to use black and yellow dots or blue and white dots in the same dot pattern. It would be least desirable to use black and white dots in the same pattern.

Figure 4:
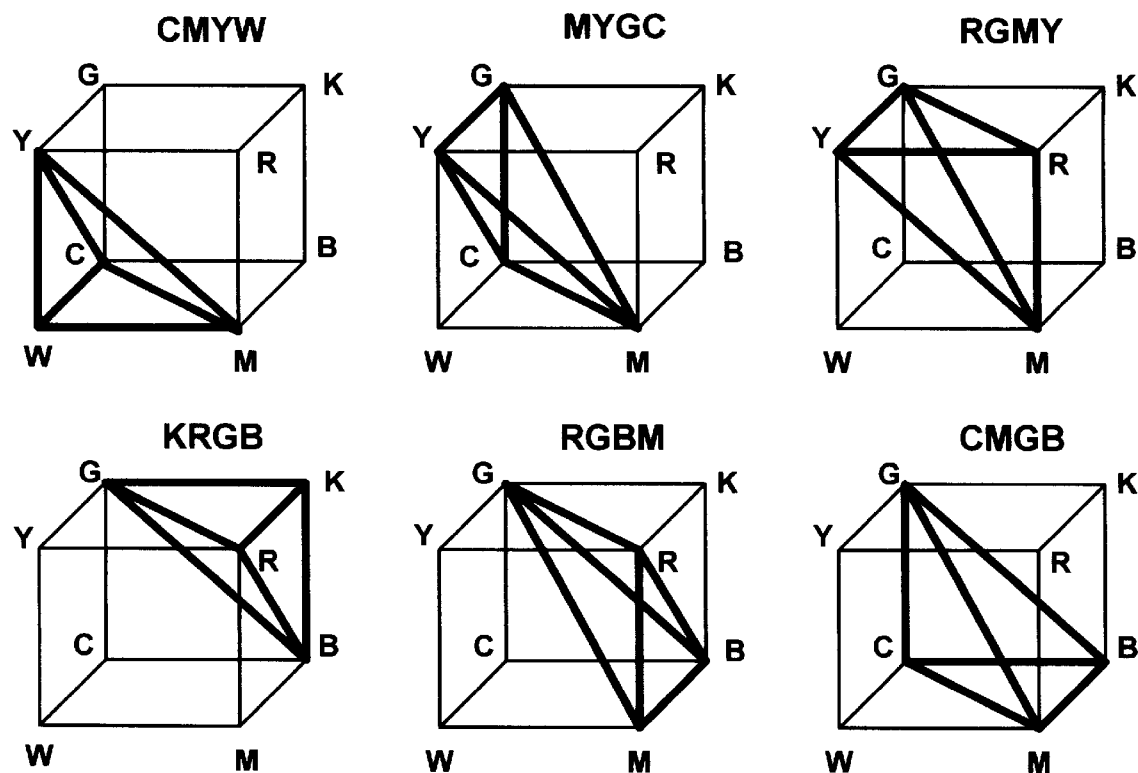
FIG. 4 is an illustration of a limited set of color simplices for the dithering method of FIG. 2.

Each color quadruple defines a three-dimensional simplex—a tetrahedron—in the color space. Each vertex of the tetrahedron corresponds to a base color in the color quadruple, and a point corresponding to the color of the pixel is contained within the tetrahedron or on a surface of the tetrahedron. The tetrahedra defined by the six color quadruples—CMYW, MYGC, RGMY, KRGB, RGBM, and CMGB—are shown in FIG. 4. Hereinafter, the terms selected color quadruple and selected tetrahedron will be used interchangeably.

The second of the four steps (step 104) is to determine the barycentric coordinates of the pixel color. The barycentric coordinates (k, r, g, b) of the desired color are computed from the solution of equations (1) and (2):

$$C=Kk+Rr+Gg+Bb \quad (1)$$

$$1=k+r+g+b \quad (2)$$

where K, R, G, and B are the RGB coordinate vectors of black, red, green, and blue base colors, and C is an RGB vector of the desired color. If the pixel color C is contained in the convex hull of the KRGB tetrahedron, all of the coordinates k, r, g and b are positive.

The barycentric coordinates of the pixel color indicate relative amount of black, red, green and blue dots used to render the large, solid patch of the pixel color. Assuming a linear behavior of color mixing, the average of the RGB value of the dots rendering a large solid patch of the pixel color will be equal to the RGB vector C.

For example, a pixel having an RGB value of (64, 64, 64) will have barycentric coordinates of (1/4, 1/4, 1/4, 1/4). In a 16×16 array, which has 256 dots, there will be 256(1/4, 1/4, 1/4, 1/4)=64 dots of black, 64 dots of red, 64 dots of green and 64 dots of blue.

The third of the four steps (step 106) is to determine barycentric coordinates of the threshold corresponding to the pixel. The threshold T is accessed from the dither matrix. The threshold T at position i,j of the dither matrix will correspond to the pixel at position i,j of the image. The barycentric coordinates ($\alpha$, $\beta$, $\gamma$, $\delta$) of the threshold T are computed as a solution of equations (3) and (4):

$$T=K\alpha+R\beta+G\gamma+B\delta \quad (3)$$

$$1=\alpha+\beta+\gamma+\delta \quad (4)$$

To save computational time and resources, the thresholds of the dither matrix can be stored as barycentric coordinates in memory (18 or 28).

The last of the four steps (step 108) is to threshold the pixel color to one of the vertices (or base colors) of the tetrahedron. A geometrical approach of performing the thresholding will now be described. First, the selected tetrahedron is partitioned into four tetrahedra by using the point corresponding to the pixel color as an additional vertex. Each partition will be defined by the point and all but one of the vertices of the tetrahedron. Second, the threshold is located inside one of the partitions. The pixel color is thresholded to the base color corresponding to the missing vertex.

Figure 5:
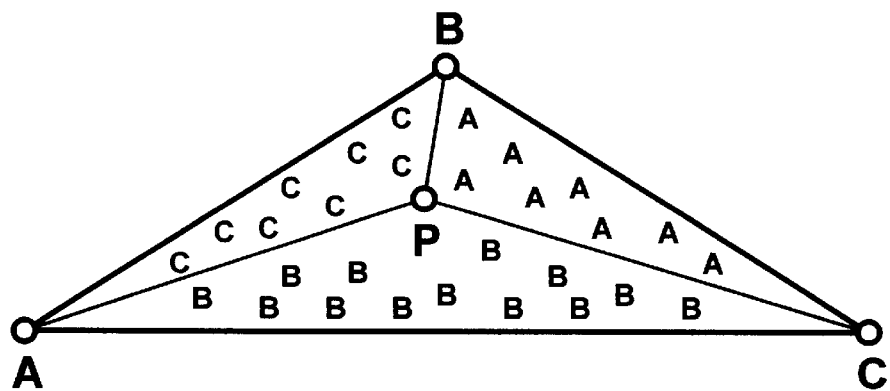
FIG. 5 is an illustration of a two-dimensional simplex that is partitioned by a color point.

For the sake of simplicity, this geometric approach is first described in connection with a two-dimensional simplex. Referring briefly to FIG. 5, the two-dimensional simplex, a triangle, is defined by three vertices A, B and C. Each vertex of the triangle ABC corresponds to a base color. The triangle ABC is partitioned into three sub-triangles ACP, BCP, ABP by a point P corresponding to a pixel color. If the threshold is located in the third triangle ABP, the pixel color P will be thresholded to the third base color C.

Applying the same approach to thresholding in a three-dimensional simplex, a tetrahedron defined by four vertices A,B,C,D would be partitioned into four sub-tetrahedra PBCD, APCD, ABPD and ABCP by a point P corresponding to a pixel color. For a threshold located in the first tetrahedron PBCD, the pixel color P would be thresholded to the base color corresponding to the first vertex A. If the thresholds are uniformly distributed in the simplex, the ratios of dots is equal to the corresponding barycentric coordinates.

One way in which the thresholding can be implemented by the processor 16 is to (1) compute barycentric coordinate ratios; and (2) threshold the pixel color to the color of the largest ratio. If, for instance, the KRGB color quadruple is selected, the processor 16 will determine the barycentric coordinate ratios $k/\alpha$, $r/\beta$, $g/\gamma$ and $b/\delta$ for pixel i,j and then threshold the pixel color to the color corresponding to the highest ratio. Thus, if the first ratio $k/\alpha$ is highest, the pixel will be thresholded to black.

Another way in which the processor 16 can implement the thresholding is described below in connection with FIG. 8.

After the four steps 102 to 110 have been performed for a pixel, the processor determines whether any additional pixels need to be processed (step 110). If additional pixels need to be processed, the processor 16 performs the four steps 102 to 108 for the next pixel. After all of the pixels have been processed, the processor 16 might perform post-processing (step 112). After post-processing, the processor 16 sends the dot patterns to the printer 14 for printing (step 114).

An example will now be provided to illustrate the dithering method. A dither cell covers 256 pixels that form a solid patch of a color. The color has an RGB value of 192, 192, 192. Thus, each pixel covered by the dither cell will have an RGB value of 192, 192, 192. The processor processes each pixel serially or in parallel.

For each pixel in the color patch, the processor selects the WCMY color quadruple and determines the barycentric coordinates of the pixel color C to be (1/4, 1/4, 1/4, 1/4). Then the processor multiplies the barycentric coordinates by 256—the number of dots in a dot pattern. Thus, a solid patch of the color C would have 64 dots of white, 64 dots of cyan, 64 dots of magenta and 64 dots of yellow. These dot numbers also happen to be proportional to the barycentric coordinates of the color of the solid patch.

For the pixel at location (i,j), there will be a corresponding threshold T(i,j). If the barycentric coordinates of the threshold T(i,j) are (2/9, 3/9, 3/9, 1/9), the pixel at location (i,j) will be thresholded to yellow.

For the pixel at location (i, j+10), there will be a corresponding threshold T(i, j+10). If the barycentric coordinates of the threshold T(i,j+10) are (2/8, 1/8, 3/8, 218), the pixel at location (i, j+10) will be thresholded to cyan.

After the processor 16 has processed the 16×16 pattern, all pixels in the 16×16 pattern will have been filled. If the dither matrix is well-designed (one way of designing the dither matrix is described below), the corresponding dot pattern will have 64 dots of white, 64 dots of cyan, 64 dots of magenta and 64 dots of yellow. Thus, the dot pattern would be perceived as a solid patch having an RGB value of 192, 192, 192.

Figure 6:
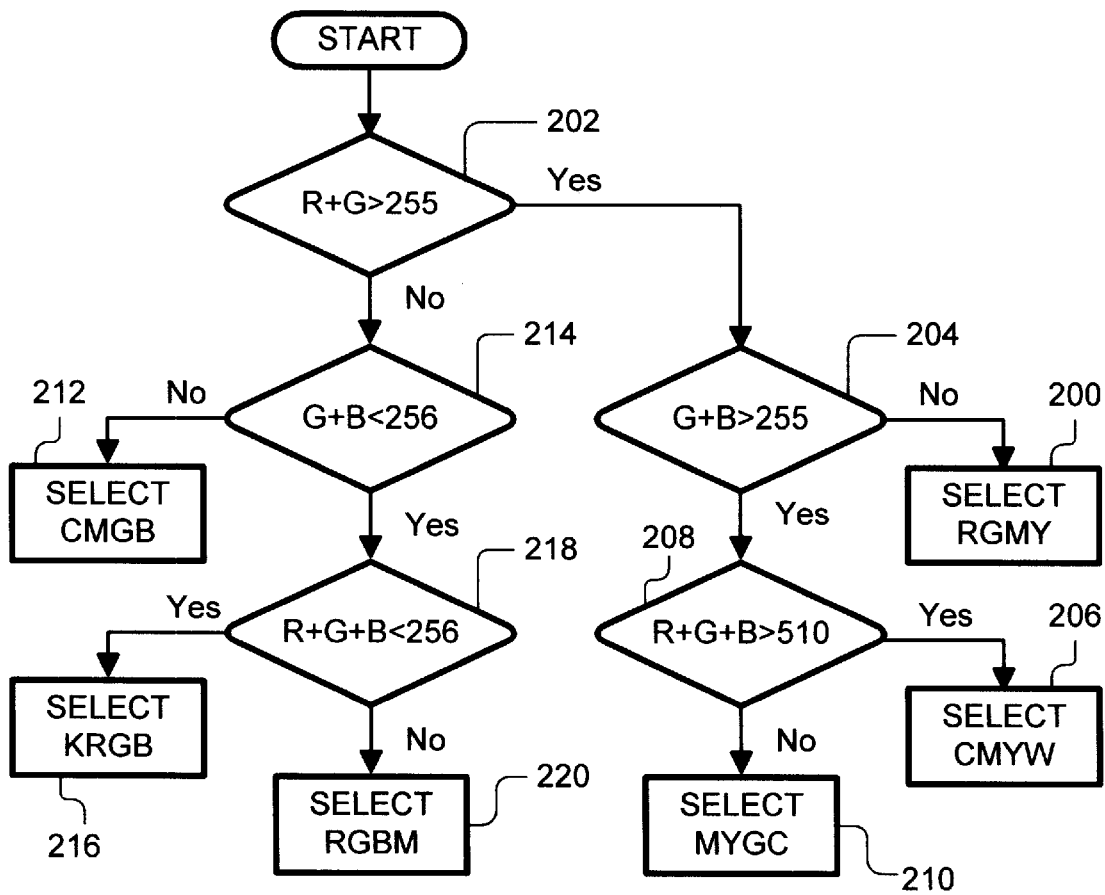
FIG. 6 is a flowchart of a method of selecting a color quadruple from those shown in FIG. 4.

FIG. 6 shows but one example of how a color quadruple can be selected from a 24-bit word representing a pixel color. Maximum value for each of the red, green and blue components of the 24-bit word is 255. A color quadruple is selected by comparing different sums of the component values to different thresholds. For example, the RGMY color quadruple is selected (block 200) if the sum of the red and green values is greater than 255 (block 202) and the sum of the green and blue values is less than or equal to 255 (block 204).

The CMYW color quadruple is selected (step 206) if the sum of the red and green values is greater than 255 (step 202), the sum of the green and blue values is greater than 255 (step 204), and the sum of the red, green and blue values is less than or equal to 510 (step 208).

The MYGC color quadruple is selected (step 210) if the sum of the red and green values is greater than 255 (step 202), the sum of the green and blue values is greater 255 (step 204), and the sum of the red, green and blue values is greater than 510 (step 208).

The CMGB color quadruple is selected (step 212) if the sum of the red and green values is not greater than 255 (step 202) and the sum of the green and blue values is less than 256 (step 214).

The KRGB color quadruple is selected (step 216) if the sum of the red and green values is not greater than 255 (step 202), the sum of the green and blue values is less than 256 (step 214), and the sum of the red, green and blue values is less than 256 (step 218).

The RGBM color quadruple is selected (step 220) if the sum of the red and green values is not greater than 255 (step 202), the sum of the green and blue values is less than 256 (step 214), and the sum of the red, green and blue values is greater than 255 (step 218).

Figure 7:
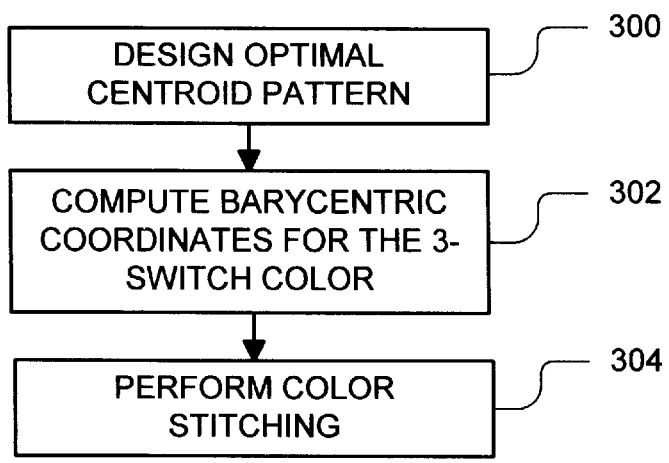
FIG. 7 is a flowchart of a method of generating a dither matrix.

FIG. 7 shows a method of generating a 16×16 dither matrix having up to 256 different threshold levels. It should be noted that the 16×16 dither matrix is merely exemplary, and that the dither matrix could be larger or smaller. First, an optimal centroid control pattern is designed (block 300). The optimal centroid pattern contains 64 dots of black, 64 dots of red, 64 dots of green and 64 dots of blue.

A control pattern is designed for color (64+3m, 64−m, 64−m, 64−m), where m=1,2, ... , 64. For each increment of m, one dot of red, one dot of green, and one dot of blue are transformed to three dots of black.

A control pattern is also designed for color (64−m, 64+3m, 64−m, 64−m), where m=1,2, ... , 64. For each increment of m, one dot of black, one dot of green, and one dot of blue are transformed to three dots of red.

A control pattern is also designed for color (64−m, 64−m, 64+3m, 64−m), where m=1,2, ... , 64. For each increment of m, one dot of black, one dot of red, and one dot of blue are transformed to three dots of green.

A control pattern is also designed for color (64−m, 64−m, 64−m, 64+3m), where m=1,2, ... , 64. For each increment of m, one dot of black, one dot of red, and one dot of green are transformed to three dots of blue.

Since a threshold in the dither matrix influences only the corresponding position in each of the control patterns, the threshold T (i, j) of the matrix position is located by inspecting the (i, j) position in all the control patterns. Thus the following is performed for all the positions (i, j) of the dither matrix.

Suppose that the centroid pattern renders a black dot at position (i, j). All the dot patterns along the path to (256,0,0, 0) (pure black) also render a black dot at the (i,j) position. At some control color along the path to (0, 256, 0, 0) (pure R) the black dot should switch to red. Similarly, at some control color along the path from the centroid pattern to (0, 0, 256, 0) (pure green) the dot switches to green, and at some control color along the path to (0, 0, 0, 256) (pure blue) the dot switches to blue.

The barycentric coordinates of the threshold at position (i, j) may be calculated from the three switch color (block 302): Assuming again that the centroid color in the (i, j) position was black, the G-switch-color corresponds to the threshold on the plane through R, B, and the G-switch-color. Thus, the threshold is the intersection of three planes: The plane through R, B and the G-switch color, the plane through G, B, and the R-switch-color, the plane through R. G, and the B-switch-color.

The intersection of the three planes can be computed as follows. If the centroid color is black, set K=64. The intersection of the three planes occurs at (k,r,g,b)=[R*G*B, (256−3R)*G*B, R*(256−3G)*B, R*G*(256−3B)].

If the centroid color is red, set R=64. The intersection of the three planes occurs at (k,r,g,b)=[(256−3K)*R*G, K*G*B, K*(256−3G)*B, K*G*(256−3B)].

If the centroid color is green, set G=64. The intersection of the three planes occurs at (k,r,g,b)=[(256−3K)*R*B, K*(256−3R)*G, K*R*B, K*R*(256−3B)].

If the centroid color is blue, set B=64. The intersection of the three planes occurs at (k,r,g,b)=[(256−3K)*R*G, K*(256−3R)*G, K*R*(256−3G), K*R*G].

Then the intersections of the three planes is normalized as follows: (k,r,g,b)←(k,r,g,b)/(k+r+g+b).

Note that this procedure ensures that the resulting screen reproduces all the control patterns, and that the control patterns are designed with the correct mixtures of halftone dots. Since the control path expands over the whole simplex, this property should extend to all colors, and the resulting dither matrix is close to being mean color invariant.

The resulting threshold distribution is usually not uniform in the simplex. However, uniformity may be sacrificed in order to reduce the noticeability of dots. In this regard, the dither matrix is not limited to any particular threshold distribution.

Color stitching can then be performed to use the same dither matrix for all six simplices (block 304). Using the following mapping for KRGB space ensures that the stitches between the tetrahedra will not be apparent as a change in the halftone pattern.

K,R,G,B→M,R,G,B

K,R,G,B→M,C,G,B

K,R,G,B→M,R,G,Y

K,R,G,B→M,C,G,Y

K,R,G,B→M,C,W,Y

The transformation can be performed if the dither matrix is described in barycentric coordinates. The barycentric coordinate system is invariant to such regular affine mappings.

The rationale for color stitching is as follows. Suppose when rendering an image there is a continuous color gradation from one tetrahedron to its neighbor. At the boundary between two tetrahedra only three out of four dot colors are used for rendering. The same three colors are used regardless of which of the two bounding tetrahedra the boundary color is classified . The resulting pattern should be invariant to the classification at the boundary. Invariance can be obtained if for every couple of tetrahedra with an adjacent face the vertices are arranged to match the common faces.

Figure 8:
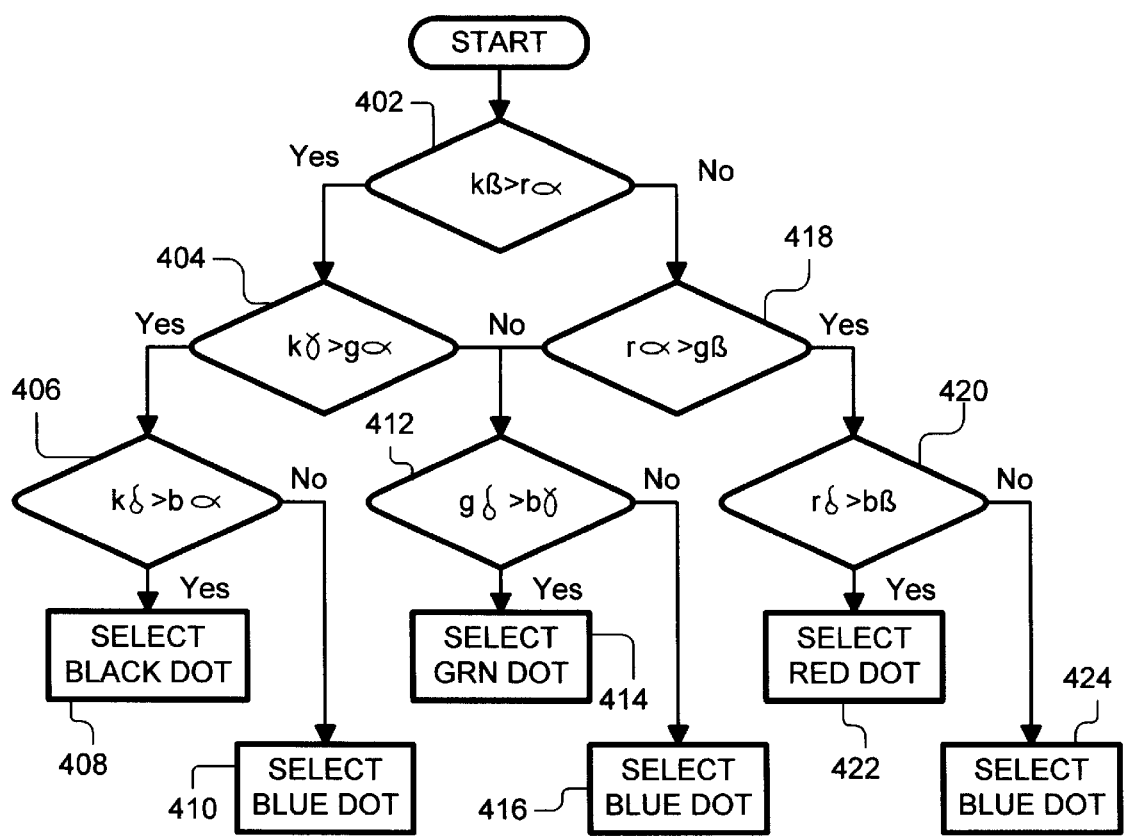
FIG. 8 is a flowchart of a computationally efficient method of performing a thresholding operation, which may be performed as part of the dithering method.

FIG. 8 shows a computationally efficient method of performing thresholding. The example is applied to the KRGB color quadruple. The method is a simple bubble sort where all ratio comparisons have been multiplied by a common denominator. This allows thresholding to be performed without computing ratios. Decision blocks 402, 404 and 406 lead to either the selection of a black dot (block 408) or a blue dot (block 410). Decision blocks 402, 404 and 412 lead to either the selection of a green dot (block 414) or a blue dot (block 416). Decision blocks 402, 418 and 420 lead to either the selection of a red dot (block 422) or a blue dot (block 424).

Thus disclosed is a halftoning method that reduces the variations in brightness between dots in a solid color patch by using no more than four colors to render the solid color patch. The method according to the present invention can be performed by using a barycentric coordinate system. In contrast to a traditional Cartesian coordinate system, the barycentric coordinate system is intrinsic because the barycentric coordinates of a color represent the relative number of dots of each base color which should be used in rendering a solid patch of the color.

The invention is not limited to the embodiments described above. For example, computational efficiency could be increased by representing pixel color values from the start in barycentric coordinates. The dither matrix may also be stored in barycentric form. This would greatly increase the speed of the thresholding operation. Another increase in processing speed could be achieved by processing the pixels in parallel.

As for the dither matrix, it could have a property where thresholds are selected such that the local average color of the dots in a solid color patch is the color of the solid color patch. To achieve this property, the distribution of thresholds in the simplex would be made relatively uniform. Another dither matrix property could be that the thresholds are selected such that the placement pattern of the dots is visually unnoticeable.

The invention is not limited to the six color partitions (quadruples) described above. Different color partitions could be made for different purposes.

The invention is not limited to an inkjet printer having eight printable colors. The invention can also be applied to inkjet printers that can control the amount of ink at a dot and, therefore, can print more than eight colors. Recent advances in inkjet technology have resulted in printers that can place dots having colors located inside the RGB cube, in addition to the eight colors at its vertices. The dithering method may be modified so as to give a solution to the control of such printers: instead of partitioning the color space into six tetrahedra, the color space of the printable colors would be partitioned into a larger number of tetrahedra, each of which is a convex hull of four base colors.

The invention could be applied to a computer monitor that displays less than a full range of colors. For example, the invention could be applied to a CRT that can display only 256 colors. The color space of the displayable colors of the video monitor would be partitioned into an even larger number of tetrahedra, each of which is a convex hull of four base colors.

Figure 9:
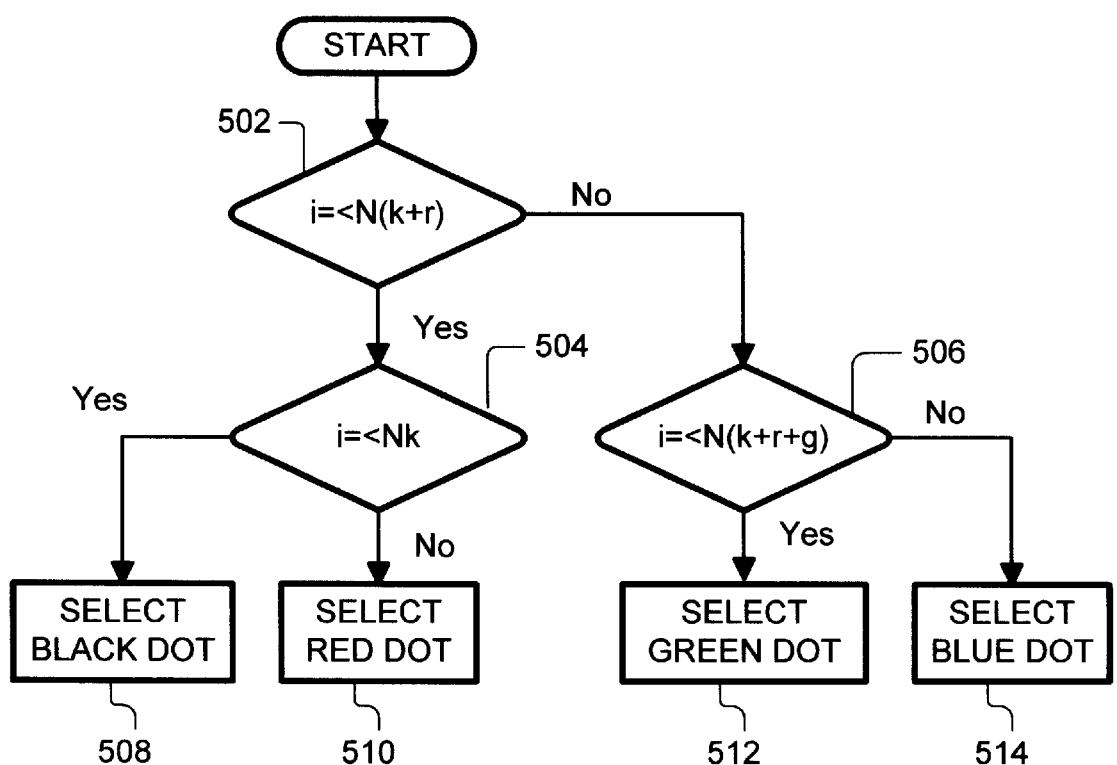
FIG. 9 is a flowchart of an alternative thresholding operation according to the present invention.

The invention is not limited to the specific simplex vector selection (thresholding) method. An alternative thresholding method, Cartesian thresholding in a simplex, is shown in FIG. 9. The pixels are processed serially or in parallel. A threshold i corresponds to each pixel. The thresholds i for Cartesian thresholding in a simplex are scalar numbers {1, 2, . . . , N} that are placed in a matrix. Assume that the KRGB color quadruple is selected. The thresholding is performed according to the barycentric coordinates (k, r, g, b) of the input color. A black dot is printed if the threshold i is less than the product of N and k (block 502, 504 and 506). A red dot is printed if the threshold i is between the product of N and k and the product of N and k+r (blocks 502, 504 and 510). A green dot is printed if the threshold i is between the product of N and k+r and the product of N and k+r+g (blocks 502, 506 and 512). A blue dot is printed if the threshold i is greater than the product of N and k+r+g (blocks 502, 506 and 514).

The invention is not limited to three-dimensional simplices. In instances where color printing is analyzed in four dimensions, the dithering method could be applied to four dimensions. In instances where two-dimensional projections of three-dimensional color space are made, the dithering method could be applied to two dimensions.

Therefore, the invention is not limited to the specific embodiments described above. Instead, the invention is construed according to the claims that follow.

What is claimed is:

1. A method of representing a pixel color in an image with a representative color of a color pattern, the color pattern being displayable by an imaging device having a limited set of display colors, the set of display colors defining a color space, the method comprising:

selecting a subset of the limited set, the subset having N display colors that can render a solid color patch of the pixel color, where N is an integer greater than two and less than the number of display colors in the limited set, the colors of the subset corresponding to vertices of a simplex in the color space, the simplex having (N–1) dimensions; and performing a point operation to select one of the vertices of the simplex and thereby select the representative color as the subset color corresponding to the selected vertex;

the pixel color being processed independently of other pixel colors in the image.

2. The method of claim 1, wherein the subset is selected from a plurality of simplices within the color space.

3. The method of claim 1, wherein the point operation is a thresholding operation that is performed by comparing barycentric coordinates of the pixel color to barycentric coordinates of a threshold.

4. The method of claim 3, wherein the thresholding operation is performed by:

partitioning the simplex into a plurality of partitions by using the point corresponding to the pixel color as an additional vertex, each partition being defined by the point and all but one of the vertices of the simplex; and locating the threshold inside one of the partitions;

wherein the pixel color is thresholded to the subset color corresponding to the missing vertex.

5. The method of claim 3, wherein the barycentric coordinates are compared by taking ratios of color to threshold for each barycentric coordinate, wherein the pixel color is thresholded to the subset color corresponding to the largest ratio.

6. The method of claim 3, wherein the barycentric coordinates are compared by performing a bubble sort of the barycentric coordinate ratios of the color and the threshold.

7. The method of claim 3, further comprising the step of accessing a single dither matrix to obtain the threshold.

8. The method of claim 1, wherein N=4, and wherein the vertices define a tetrahedron, whereby the subset of display colors is a color quadruple.

9. The method of claim 8, wherein the limited set of colors consists of the colors black, blue, red, green, magenta, cyan, yellow and white; the method further comprising the step of selecting the color quadruple from a group including the color quadruples CMYW, MYGC, RGMY, KRGB, RGBM and CMGB.

10. The method of claim 1, wherein the point operation is a Cartesian thresholding operation that is performed by comparing barycentric coordinates of the color to a plurality of thresholds.

11. Apparatus for converting a plurality of pixel colors of an image into a plurality of representative colors in a color pattern, the color pattern being renderable by a limited set of display colors, the display colors defining a color space, the apparatus comprising:

a processor; and processor memory encoded with a plurality of executable instructions, the instructions, when executed, instructing the processor to select an (N–1)-dimensional simplex in the color space for each pixel color, each selected simplex being defined by N display colors that can render a solid color patch of a corresponding pixel color, where N is an integer greater than two and less than the number of display colors in the limited set;

for each selected simplex, the processor being further instructed to use a dither matrix to perform a point operation to select one of the vertices and thereby select a representative color as the color corresponding to the selected vertex;

each pixel color being processed independently of other pixel colors in the image;

whereby a solid patch of each pixel color can be rendered by a dot pattern having no more than N different colors.

12. The apparatus of claim 11, wherein the processor memory is further encoded with at least one dither matrix of thresholds; and wherein the instructions instruct the processor to perform the point operations by partitioning each selected simplex into a plurality of partitions; and locating the thresholds inside the partitions.

13. The apparatus of claim 11, wherein the processor memory is further encoded with at least one dither matrix; and wherein the instructions instruct the processor to perform the point operation by comparing barycentric coordinates of the pixel colors to barycentric coordinates of thresholds in the dither matrix.

14. The apparatus of claim 13, wherein the thresholds have a uniform threshold distribution for each selected simplex.

15. The apparatus of claim 13, wherein the instructions instruct the processor to compare the barycentric coordinates by taking ratios of pixel colors to thresholds.

16. The apparatus of claim 13, wherein the instructions instruct the processor to compare the barycentric coordinates by performing bubble sorts of the barycentric coordinate ratios of the pixel colors and the thresholds.

17. The apparatus of claim 11, wherein the instructions instruct the processor to perform the point operation by comparing barycentric coordinates of the color to a plurality of Cartesian thresholds, whereby Cartesian thresholding in a simplex is performed.

18. The apparatus of claim 11, wherein N=4, whereby the processor is instructed to select one of the vertices of each selected tetrahedron.

19. The apparatus of claim 18, wherein the limited set of display colors consists of black, blue, red, green, magenta, cyan, yellow and white; and wherein the instructions further instruct the processor to select each simplex from a group of CMYW, MYGC, RGMY, KRGB, RGBM and CMGB.

20. The apparatus of claim 11, further comprising printing means for printing the color pattern with the limited set of display colors.

21. The apparatus of claim 11, further comprising a video monitor for displaying the dot pattern with the limited set of display colors.

22. An article of manufacture for instructing a processor to convert a pixel color of an image into a dot color of a dot pattern, the dot pattern being renderable with a limited set of display colors, the display colors defining a color space, the article comprising:

processor memory; and a plurality of executable instructions encoded in the memory, the instructions, when executed, instructing the processor to select a subset of N display colors that can render a solid color patch of the pixel color, where N is an integer greater than two and less than the number of display colors in the limited set, the colors of the subset corresponding to vertices of a simplex in the color space, the simplex having (N−1) dimensions;

the instructions further instructing the processor to perform a point operation to select one of the vertices of the simplex and thereby select the dot color as the subset color corresponding to the selected vertex; the pixel color being converted independently of other pixel colors in the image.

23. The article of claim 22, further comprising a dither matrix encoded in the memory; wherein the executable instructions instruct the processor to perform the point operation by comparing barycentric coordinates of the pixel color to barycentric coordinates of a corresponding threshold in the dither matrix.

24. The article of claim 23, wherein the dither matrix has a uniform threshold distribution in the simplex.

25. The article of claim 23, wherein the instructions instruct the processor to perform the point operation by partitioning the simplex into a plurality of partitions by using a point corresponding to the corresponding pixel color as an additional vertex, each partition being defined by the point and all but one of the vertices of the simplex; the instructions further instructing the processor to locate the threshold inside one of the partitions, wherein the pixel color is thresholded to the color corresponding to the missing vertex.

26. The article of claim 23, wherein the instructions instruct the processor to compare the barycentric coordinates by performing a bubble sort of the barycentric coordinate ratios of the color and the threshold.

27. The article of claim 22, wherein the instructions instruct the processor to perform the point operation by comparing barycentric coordinates of the color to a plurality of Cartesian thresholds, whereby Cartesian thresholding in a simplex is performed.

28. The article of claim 22, wherein N=4, whereby the processor is instructed to select one of the vertices of a tetrahedron.

29. The article of claim 28, wherein the limited set of colors consists of the colors black, blue, red, green, magenta, cyan, yellow and white; and wherein the instructions further instruct the processor to select the simplex from a group of tetrahedra including CMYW, MYGC, RGMY, KRGB, RGBM and CMGB.

30. Apparatus for converting a plurality of pixel colors of an image into a plurality of representative colors of a display color set, the apparatus comprising:

means for selecting an (N−1)-dimensional simplex for each pixel color, each selected simplex being defined by N display colors that can render a solid color patch of a corresponding pixel color, where N is an integer greater than two and less than the number of display colors in the set; and means for selecting vertices by performing point operations to select vertices of the simplexes, the selected vertices corresponding to colors of the display set;

each pixel color being converted independently of other pixel colors in the image.

* * * * *

UNITED STATES PATENT AND TRADEMARK OFFICE
CERTIFICATE OF CORRECTION

PATENT NO. : 6,304,333 B1 Page 1 of 1
DATED : October 16, 2001
INVENTOR(S) : Shaked, Doron et al.

It is certified that error appears in the above-identified patent and that said Letters Patent is hereby corrected as shown below:

<u>Title page,</u>
Item [75], reads:

"Shaked; Doron (Haifa, IL); Arad; Nur (Tel-Aviv, IL); Baharav; Izhak (Girat-Ela, IL); Lin; Qian (Santa Clara, CA)" should read to the intended order as shown below:
-- Arad; Nur (Tel-Aviv, IL); Shaked; Doron (Haifa, IL); Baharav; Izhak (Girat-Ela, IL); Lin; Qian (Santa Clara, CA) --

Signed and Sealed this

Twentieth Day of May, 2003

JAMES E. ROGAN
*Director of the United States Patent and Trademark Office*